United States Patent [19]

Peppel

[11] 4,373,894
[45] Feb. 15, 1983

[54] METHOD AND APPARATUS FOR MAKING PLASTIC TUBES

[75] Inventor: George W. Peppel, Arlington, Tex.

[73] Assignee: Patient Technology, Inc., Hauppauge, N.Y.

[21] Appl. No.: 123,633

[22] Filed: Feb. 22, 1980

[51] Int. Cl.³ .............................................. B29C 3/00
[52] U.S. Cl. .................................. 425/393; 264/296; 264/320
[58] Field of Search ................. 425/393; 264/320, 296

[56] References Cited

U.S. PATENT DOCUMENTS

| | | | |
|---|---|---|---|
| 1,919,918 | 7/1933 | Whitehouse | 425/393 X |
| 2,514,937 | 7/1950 | Collins | 425/393 |
| 2,876,496 | 3/1959 | Murphy | 264/296 X |
| 3,300,559 | 1/1967 | Baehr | 264/323 |
| 3,475,786 | 11/1969 | Pearson | 425/393 X |
| 3,509,252 | 4/1970 | Baehr | 264/296 |
| 3,929,943 | 12/1975 | Klimaszewski | 264/322 X |
| 4,017,582 | 4/1977 | Naumann | 264/296 X |
| 4,102,623 | 7/1978 | Mathison | 425/393 |
| 4,219,525 | 8/1980 | Greenspan | 264/296 X |
| 4,292,270 | 9/1981 | Hannah | 264/320 |
| 4,302,174 | 11/1981 | Hinzmann | 264/296 X |
| 4,316,870 | 2/1982 | Rowley | 264/296 |

Primary Examiner—Thomas P. Pavelko
Attorney, Agent, or Firm—Bauer & Amer

[57] ABSTRACT

A method and apparatus to close an end of a hollow thermoplastic tube is disclosed. The apparatus includes a female die with an interior shaped end in the configuration of the desired closed end of the tube. The shaped end of the die is heated to the softening point of the plastic. The portion of the die adjacent the shaped end is in contact with a heat sink to maintain that portion of the tube adjacent the closed end at a temperature at least 15° F. below the softening point of the plastic to prevent deformation of the tube.

8 Claims, 8 Drawing Figures

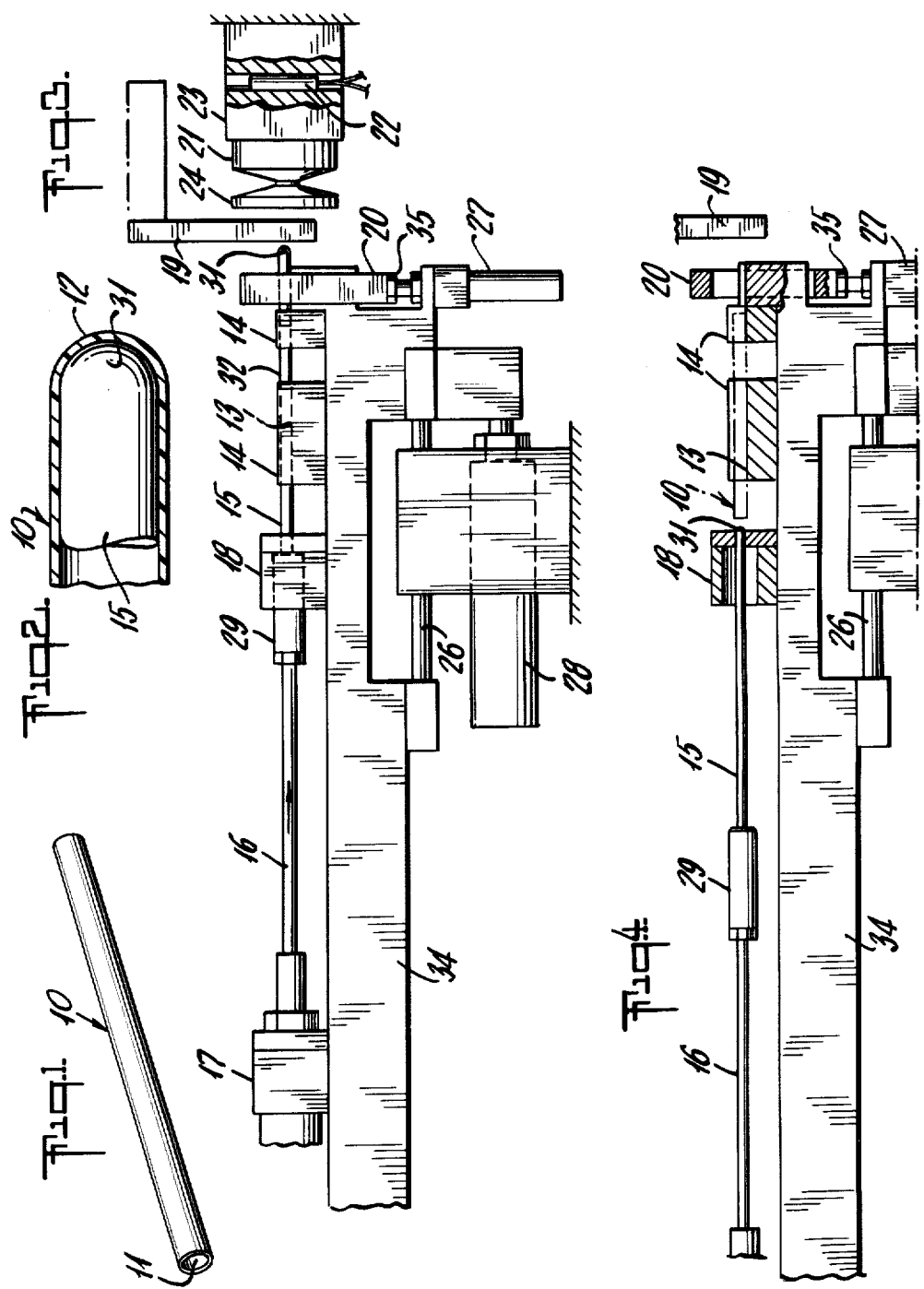

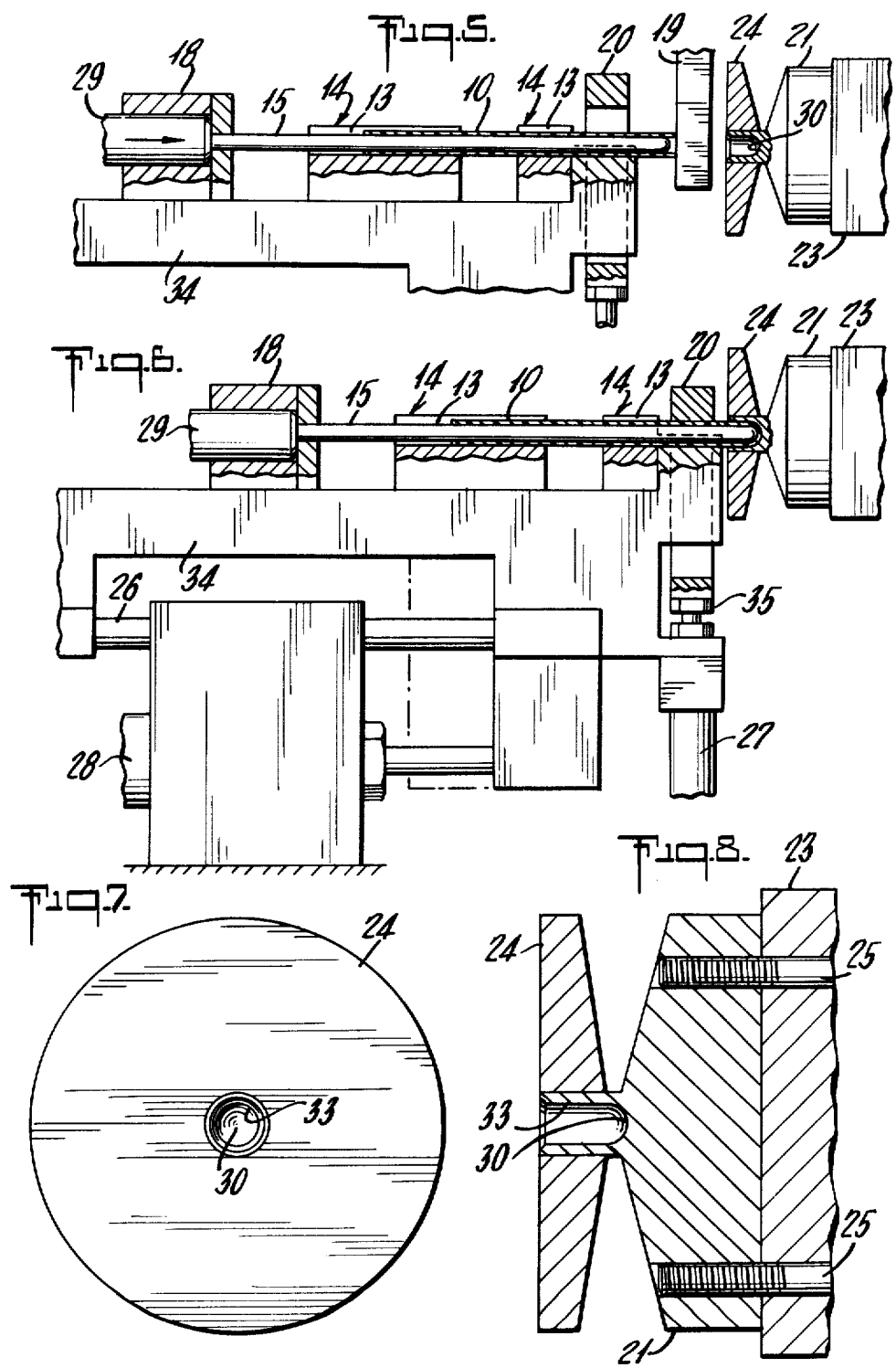

4,373,894

METHOD AND APPARATUS FOR MAKING PLASTIC TUBES

BACKGROUND OF THE INVENTION

This application relates to an apparatus for forming a sealed end of a hollow thermoplastic tube. These tubes are used as covers for probes of electronic thermometers and may also be used as containers for elongated objects.

Prior art processes for forming such tubes included multiple steps which entailed the movement of the hollow tube from one work station to another work station in order to complete the formation of the closed end of the tube. Examples of such processes are shown in U.S. Pat. Nos. 2,876,496 and 3,509,252. Other processes entailed complicated apparatus which had to alternatively heat and cool a portion of the apparatus to form the closed end of the tube. Such a process is shown in U.S. Pat. No. 3,300,559. These complicated processes and apparatus were thought to be necessary to avoid excessive softening or melting and the resulting deformation of the plastic tubes. Other prior art processes for forming closed ends of tubes employed processes for beveling the edges of the tubes prior to the heating of the tubes to close the ends, such as that shown in U.S. Pat. No. 3,929,943.

SUMMARY OF THE INVENTION

The present invention employs a relatively simple process and apparatus to close the end of a tube in a one-step operation. In the present process, the heating element to soften and integrate the plastic of the tube operates at a temperature just slightly higher than the softening point of the plastic. Damage to the tube, due to deformation or the melting of the tube itself, is prevented by maintaining the portion of the tube immediately adjacent the end to be closed at a temperature considerably below the softening point of the plastic. The control of the temperature can be accomplished by employing a heated die in the configuration of a hollow cylinder with a closed end in the desired shape of the closed end of the tube. The external portion of the cylinder, adjacent the shaped or closed end, is in contact with a heat sink to remove heat from the cylinder portion of the die, lowering the temperature of the cylinder portion of the die and thereby preventing the deformation of the tube adjacent the closed end of the tube. The present process can be used to form the sealed end of tubes made from polyethylene, polypropylene, polyvinylchloride, polyethylene terephthalate and other thermoplastic materials.

BRIEF DESCRIPTION OF THE DRAWINGS

FIG. 1 shows a hollow plastic tube with open ends.

FIG. 2 shows an enlarged cross-section of the closed end of the tube and the mandrel used in forming the closed end.

FIG. 3 shows a side view of the apparatus used in the present invention.

FIG. 4 shows a cross-sectional view of a portion of the apparatus shown in FIG. 3.

FIG. 5 shows an enlarged view in cross-section of a portion of the apparatus of the present invention.

FIG. 6 shows another view in cross-section of a portion of the present apparatus.

FIG. 7 shows the end view of the die and heat sink.

FIG. 8 shows a cross-section of the die and heat sink.

DETAILS OF THE INVENTION

Closed end plastic tubes have found utility as containers for elongated objects such as cigars, and more recently as covers to cover the probes of electronic thermometers. The electronic thermometers have found increasing use in taking temperatures in hospitals, as well as in doctor's offices and in homes. Electronic thermometers include an elongated probe which is inserted into a cavity of a patient for taking the patient's temperature. In order to prevent the transfer of infectious microorganisms between one patient and another, it is common to cover the thermometer probe with a disposable sheath or cover, which is discarded after a patient's temperature is taken. These probe covers are usually made of a thermoplastic material such as polyethylene, polypropylene or polyvinylchloride. As the probe covers are discarded after a single use, it is necessary that they be made as inexpensively as possible. The present invention provides a process and apparatus to manufacture such probe covers from plastic tubes at high rates of production and at low cost.

The prior art processes for forming closed ends of plastic tubes heated the plastic to a temperature slightly below the melting temperature of the plastic. Heating the plastic to a temperature near its melting point caused the plastic tubes to deform at a point adjacent the closed end of the tube. This deformation resulted in ripples, corrugations or holes in the tube, rendering the tube useless for its intended purpose.

The present process operates at a temperature above the softening point or glass transition temperature and below melting point of the plastic used in the tube. The contact time of the tube in the die is extremely short, usually two or three seconds. Damage to the tube or deformation of the tube adjacent to the closed end of the tube is prevented by maintaining that portion of the tube at a temperature between 15° F. and 25° F. lower than the softening point of the plastic.

In the drawings, element 10 is the plastic hollow tube or straw stock material from which the closed end tubes are manufactured. This straw is cut to a length slightly longer than the length of the finished tube. For use as a probe cover for an electronic thermometer, the straw would typically be three and one half inches long, have an inside diameter of approximately three sixteenths of an inch, and the wall thickness would be approximately 0.007–0.009 inches.

The apparatus has straw supports 14, having semicircular grooves 13 which are slightly wider than the outside diameter of the straws 10. The grooves 13 receive the straw from a source of supply and align the straw so that it may be carried by a mandrel 15 into a heated die 21. The gap 32 between the straw supports allows the finished tube to be easily removed by hand or by mechanical means not shown. The mandrel 15 has a diameter which allows it to fit into the inside of the straw. The mandrel is connected to a shaft 16 which can be moved forward or rearward by an air cylinder 17 or any other suitable mechanism. The mandrel is connected to the shaft 16 through an adjustable mandrel stop 29 which can limit the forward movement of the mandrel when it engages the mandrel support 18. The forward end of the mandrel 31 has a configuration that corresponds to the desired shape of the closed end 12 of the finished tube. A movable straw stop 19 limits the forward motion of the straw as it is carried forward by the mandrel. The difference in the distance between the forward end of the mandrel 15 and the forward end of the straw 10 creates an overlap of plastic material or a free end portion of the tube which will be converted into the closed end of the finished tube by the application of heat and pressure. After the mandrel 15 reaches the limit of its travel, a clamp 20 is activated by an air cylinder 27 to clamp the straw 10 onto the mandrel 15. The movement of the clamp in relation to the mandrel 15 can be modified by an adjusting bolt 35. The frame 34 is supported on a base, not shown, through a slide mechanism 26 which allows the frame 34 and the components mounted on the frame to be moved toward or away from the die 21 by an air cylinder 28.

The heated die 21, which functions to soften and integrate the plastic of the straw to form it into the closed end, is best shown in FIG. 8. The die 21 is constructed in one piece from a metal such as steel. The preferred shape of the die is that of a slightly tapered cone with the area of the apex of the cone extending as a hollow cylinder 33. The closed end 30 of the cylinder may be dome shaped, as shown in the drawings, or may be any other suitable configuration depending on the desired shape of the closed end of the finished tube. The die is heated by a heater 22, shown in FIG. 3, which supplies sufficient heat through a heat transfer ring 23 through the base of the die to heat the bottom end or the dome portion 30 of the die to a temperature which is slightly above the softening temperature of the plastic of the straw. Immediately surrounding the exterior of the cylindrical portion of the die 33, there is a metallic collar or disk 24, which acts as a heat sink and which is separated from the conical portion of the die by an air gap. As shown in FIGS. 7 and 8, the collar is in the shape of a solid circular disk with one flat surface and a tapered surface. It should be understood that the collar could be a shape different than that shown in the drawings and could be finned or perforated rather than solid. The collar 24 is constructed of a metal which has a higher heat conductivity than the die. For example, the die 21 would be made from steel and the collar 24 made from copper or aluminum. This allows the heat furnished from the heater to flow through the heat supply ring 23 into the die 21, to heat the domed portion of the die to a maximum temperature. The heat transferred to the cylindrical portion of the die is rapidly dissipated by the heat sink 24, to lower the temperature at the cylindrical portion of the die 33. In the operation of the device, the cylindrical portion of the die 33 is at a temperature which is between 15° F. and 25° F. below the domed portion 30 of the die and below the softening point of the plastic of the straw. This difference in temperature prevents the deformation of that portion of the straw immediately adjacent the portion of the straw that will be collapsed to form the closed end of the tube.

The heat is furnished to the die from an electric heater 22 and then it flows through the heat supply ring 23, through the conical portion of the die to the domed portion 30 of the die. The die can be attached to the heat supply ring by bolts 25 or by other means.

In operation, the straw 10 is dropped into the grooves 13 in the straw supports 14 when the mandrel 15 is in a rearward position. The mandrel is then driven forward by the air cylinder 17, connected through the shaft 16, through the open end 11 of the straw, and into the interior of the straw. As the mandrel continues forward, it drives the straw forward, through frictional contact between the mandrel and the inside of the straw until the forward end of the straw reaches the straw stop 19. The mandrel 15 is then stopped by the mandrel stop 29 coming into contact with the mandrel support 18. The distance between the end of the straw and the end of the mandrel is adjusted so that there is a sufficient overlap of plastic material to form a closed end on the straw. When using the apparatus to manufacture a probe cover for an electronic thermometer, this overlap is approximately 0.045 inches. The clamp 20 is then closed by air cylinder 27 to clamp the straw onto the mandrel. The straw stop 19 is removed from the position shown in FIG. 3 by a suitable mechanism. The frame 34 carrying the straw clamp, the straw and mandrel are advanced towards the heated die by the activation of the slide air cylinder 28. The straw 10 is advanced into the die at a speed of about one-quarter inch to about one inch per second. The straw enters the heated die where the portion of the straw overlapping the mandrel is softened and immediately forced into the shape of the die to integrate the plastic into the desired shape of the closed end of the die. In the manufacture of closed end tubes for use as thermometer probe covers, polypropylene having a melting point of from 300°-350° F. is used as the plastic material. The cylindrical portion of the die 33 adjacent the collar is maintained at a temperature of about 275° F. The straw is introduced into the heated die at a pressure of about 300 psi., which is sufficient to cause the integration of the plastic into the desired shaped end. The shape of the end of the mandrel 15 corresponds to the shape of the end of the female die. The end of the straw is closed in a matter of seconds and the frame 34, activated by the slide air cylinder 28, is moved rearward carrying the straw out of the heated die. The mandrel 15 is then removed from the straw by reversing the air cylinder 17 and the finished tube removed from its position on the straw supports 14. The activation of the various air cylinders to control the operating sequence of the apparatus can be controlled by timing devices or by switches which are activated by the movement of the various components of the present apparatus.

The present apparatus can be employed in multiple units arranged to operate simultaneously or in sequence. A sequential operation could be employed on a circular support with series of frames carrying the mandrels arranged around the circumference of the circular support. In a sequential operation, it is possible to use fewer heated dies than in a simultaneous operation. Such variations in the mechanical arrangement of the apparatus of the present invention would be apparent to those skilled in the art.

I claim:

1. Apparatus for manufacturing a thermoplastic tube of substantially uniform thickness and having an end closed pinhole free and with substantially the thickness of the remainder of the tube comprising:
    a heated die having one end portion shaped to form a hollow cylinder with a shaped closed end;
    means for heating said die;
    a heat conductive metallic collar surrounding the hollow cylinder end portion of said die and acting as a heat sink to dissipate heat therefrom;
    means for supporting an open ended thermoplastic tube of substantially uniform thickness in spaced relationship from said heated die;
    a mandrel having an end portion shaped to form a hollow cylinder with a closed end complementary to the shape of said heated die and insertable into said tube through one end thereof;

means for advancing said mandrel into said tube a predetermined distance so that an end portion of the tube projects beyond the shaped end of the mandrel;

means for holding said tube on said mandrel;

first means for relatively moving said tube and mandrel with respect to said heated die so that the tube extends into the heated die and has its projecting end shaped and closed pinhole free by interaction between the heated die and the shaped end of said mandrel, said heated die and shaped end of said mandrel pressing against the outside and inside respectively of said tube to form the same closed pinhole free in a single forming step to the thickness of substantially that of the thickness of the remainder of said tube and the inner and outer shapes of said heated die and mandrel, said metallic collar dissipating heat from said cylinder to prevent excessive heating of the side walls of the tube during shaping and closing of the projecting end; and second means for relatively moving said tube and mandrel with respect to said heated die to thereby withdraw the tube from said die.

2. The apparatus of claim 1 in which said die is made of steel and the collar is made of copper.

3. The apparatus of claim 1, wherein said heated die comprises:

a solid cylindrical portion with a base surface in contact with said means for heating;

a gradually tapering conical portion extending from the side of the solid cylindrical portion opposite the base surface, the shaped one end portion of said die being located at an apex portion of said conical portion.

4. The apparatus of claim 3, wherein the shaped end portion projects from the apex portion of said conical portion.

5. The apparatus of claim 3 or 4 in which said collar is separated from the conical portion of the die by an air gap.

6. The apparatus of claim 1, 3, or 4, wherein said means for advancing said mandrel comprises:

a shaft connected to an end of said mandrel opposite said shaped end;

a cylinder operatively associated with said shaft for moving said shaft forward and rearward; and adjustable stop means for limiting movement of said mandrel into said tube.

7. The apparatus of claim 6, further comprising means for limiting forward movement of the tube during insertion of the mandrel into the tube.

8. The apparatus of claim 6, further comprising frame means for supporting said mandrel and said cylinder, and wherein said first means for relatively moving comprises means for moving said frame means towards said heated die and said second means for relatively moving comprises means for moving said frame means away from said heated die.

* * * * *